3,064,730
METHOD OF SAND PACKING WELLS IN
UNCONSOLIDATED FORMATIONS
William T. Malone and Willis C. Cunningham, Duncan,
Okla., assignors to Halliburton Company, a corporation
of Delaware
No Drawing. Filed Mar. 30, 1959, Ser. No. 802,638
2 Claims. (Cl. 166—15)

This invention relates to a method and a fluid for treating unconsolidated formations in oil wells and the like. More specifically, the invention relates to a gelled hydrocarbon fluid that has high viscosity and low penetrating fluid properties while it is being pumped down a bore hole, and then at the point of desired application the gel breaks so that the fluid has high penetrating properties.

In certain oil producing areas, such as California and the Gulf Coast of the United States, many oil producing formations have unconsolidated sands which are produced with the oil. Such sand not only decreases the economic production of a well but also is harmful and destructive to oil well equipment. Many methods for solving the sand problem have been devised and employed. Some of these are referred to as "gravel packing," others employ screens or slotted liners, and some include a combination of these methods.

During the past few years a treating method has been developed which uses sand grains of larger sizes than the formation sand. Such sands are carried by a fluid to the unconsolidated zone. Pressure is then applied until some of the carried sand penetrates the formation and the remainder forms a pressure pack which supports the unconsolidated sand in the formation.

In accordance with the present invention, a gelled fluid is used to carry the sand, and this fluid is so controlled that it breaks at the time it reaches the formation to be treated. The fluid changes from a low penetrating fluid to a high penetrating fluid and thus readily flows into the formation, leaving the sand deposited on the formation as a sand pack.

The term "low penetrating fluid," as used herein, is defined in the patent to Farris, Reissue 23,733.

Accordingly, it is the object of the invention to provide a process of preventing the migration of unconsolidated formation sands into a well bore by forming a pressure pack of sand grains larger than the formation sand grains in the well bore adjacent to such unconsolidated formation in which a gelled fluid is used to convey the packing sand down the well bore but which gelled fluid breaks rapidly when it reaches the formation to be treated.

Other objects of the invention will be more apparent from the following description and appended claims.

In the prior art, gelled fluids for fracturing oil or gas producing formations have been made by mixing a crude or refined oil, kerosene, or diesel oil with a soap of a fatty acid. The characteristics of the resulting gelled fluids are dependent upon the particular soap used. The gelled fluids may be very stable, that is, it will remain viscous; very unstable and break at any time; or it may be necessary to add breakers so that the fluid can return to its original state of viscosity. In addition, the fluid loss properties may be low or high.

The U.S. patent to Minich, No. 2,390,609, granted December 11, 1945, discloses bodying agents for increasing the viscosity of liquid hydrocarbons.

Agents of this type are commonly used to fracture oil bearing formations as taught in the patent to Farris, Re. 23,733, reissued November 10, 1953.

Where used in fracturing, the gel should not break until after the sand is conveyed into the formation.

In accordance with the present invention, a gelling agent of the type disclosed in said Minich patent is selected and mixed with a hydrocarbon liquid and so controlled that the gel breaks when the liquid reaches the bottom of the well, or the formation to be packed, and before any large amount of sand actually enters the formation. The broken fluid then freely penetrates the formation leaving the sand behind so as to form a pack.

There are two factors to be taken into account in controlling the time of breaking of the viscosity of such treated hydrocarbon liquid. These are the temperature and the amount of water admixed with it.

By selecting a particular bodying agent, the breaking time may be made quite short. Such a viscous hydrocarbon liquid may be rendered completely non-viscous in a matter of a few minutes if a given amount of water is added. The step of selection of a particular bodying agent having the desired properties is well known to those skilled in the art, and this step, per se, forms no part of the present invention and is specifically disclaimed.

The present invention resides in the particular use to which such a viscous carrying fluid is put.

An example of an actual field operation successfully carrying out the invention is as follows:

A sand packing and consolidating operation was carried out on a well in West Delta Block 30, Plaquemines Parish, Louisiana.

A viscous fluid or gel was made by mixing the ingredients in the following proportions:

10 bbls. of diesel oil
85 pounds of an aluminum soap of mixed saturated and unsaturated dibasic and monobasic organic fatty acids.
4.2 gallons of isopropyl alcohol
1.0 gallons of fresh water The water and alcohol were added after the dispersion of the gelling agent. A suitable quantity of sand was then added.

The formation to be treated was a Miocene Sand at a depth of about 6,500 feet in a cased well with perforations at the formation. The bottom hole temperature was 150 degrees F.

The treatment was carried out in stages through tubing in the well. The formation was first broken down with salt water at about 500 p.s.i. pressure.

Five barrels of diesel were circulated into tubing ahead of 20 barrels of gel and sand. The gel was then followed by another 5 barrels of diesel. This was circulated into the tubing followed by salt water displacing the salt water below the gel from the tubing. At this point the tubing was raised above the top perforation and the surface rams closed. Additional salt water was then pumped into the tubing to displace the gel and sand. The tubing was then lowered into the hole to check for any fill-up, after which the well was reversed out with salt water.

The gel used on this operation, and mixed as stated above, has a breakdown time of about five minutes.

On this particular treatment, one of the engineers for the company for which the work was done thought that the breakdown of the viscosity of the gel was too rapid and that it would be an improvement if the viscosity life were lengthened to approximately 30 minutes. However, the treatment was regarded as successful.

The breakdown time of the above mixture can readily be lengthened (for a bottom hole temperature of 150 degrees F.) by using a lesser quantity of water. For example, using a proportion of 0.4 gallon of water instead of 1.0 gallon, which was actually used on this treatment, would give a breakdown time of 12 minutes.

It is, of course, possible that some of the sand entered the formation being treated, and the invention is not to be regarded as limited to a situation where all of the viscous gel breaks into a high penetrating fluid just as it reaches the formation.

We claim:

1. A method of preventing the migration of unconsolidated sands in the producing formation of a well by forming a pressure sand pack adjacent such formation, said method comprising; preparing a gel which will have a predetermined breakdown time under predetermined well temperature conditions, said predetermined breakdown time being the approximate time required for said gel to be pumped at a controlled rate to said producing formation, and said gel including a soap of a fatty acid, a substantially entirely hydrocarbon liquid, and an amount of water sufficient to cause the breaking of said gel at said predetermined breakdown time under said predetermined well temperature conditions; mixing sand with said gel; and pumping said thus formed gel-sand mixture into said well at said controlled rate so that said mixture reaches said producing formation at said predetermined breakdown time; said gel, upon reaching said formation, breaking to a reduced viscosity to facilitate settling of said sand and flow of said substantially entirely hydrocarbon liquid into said formation, said sand being characterized by a grain size larger than that of the formation and being deposited adjacent the face of said formation while said hydrocarbon liquid freely penetrates the formation.

2. The method defined in claim 1 in which the soap of a fatty acid is an aluminum soap of mixed saturated and unsaturated dibasic and monobasic organic fatty acids.

References Cited in the file of this patent

UNITED STATES PATENTS

| | | |
|---|---|---|
| 2,285,291 | Larsen | June 2, 1942 |
| 2,390,609 | Minich | Dec. 11, 1945 |
| 2,687,175 | Johnson | Aug. 24, 1954 |
| 2,728,395 | Howard | Dec. 27, 1955 |
| 2,905,245 | De Priester | Sept. 22, 1959 |